April 6, 1954        B. D. MASERITZ        2,674,701
SELF-CONTAINED ELECTRICAL CONTROL UNIT Filed March 28, 1952        2 Sheets-Sheet 1

INVENTOR:
B. D. MASERITZ
BY
ATTORNEY:

April 6, 1954  B. D. MASERITZ  2,674,701
SELF-CONTAINED ELECTRICAL CONTROL UNIT
Filed March 28, 1952  2 Sheets-Sheet 2

INVENTOR:
B. D. MASERITZ
BY
ATTORNEY:

Patented Apr. 6, 1954

2,674,701

UNITED STATES PATENT OFFICE 2,674,701

SELF-CONTAINED ELECTRICAL CONTROL UNIT

Bernard D. Maseritz, Bloomfield, N. J., assignor of one-half to Michael T. Moran, Bloomfield, N. J.

Application March 28, 1952, Serial No. 279,001

3 Claims. (Cl. 307—155)

This invention relates to improvements in control devices and electrical apparatus, such as control units for air conditioning devices and the like. It is the purpose of this invention to provide a portable plug-in method of remotely controlling or operating an electrically actuated device such as a portable air conditioner or other electrically affected or actuated mechanism, the remote control device in turn being actuated by any desired or convenient means such as a manually operated switch, an electrical or motor driven switch, solenoid, or other electrical device or time mechanism.

The control unit of my invention is provided with a conventional cord to be inserted into the usual receptacle or other source of electric current. The control unit in turn is provided with a receptacle into which may be plugged the device to be controlled, with control established remotely by connecting an electric switch, thermostat, clock, timer, or other control mechanism, with the circuit contained in the control unit. In the portable control unit of the invention (Fig. 2), there are incorporated an electric relay, solenoid, or magnetic switch that opens or closes the main or secondary circuit to the device to be operated, and an electric transformer to produce a low safe voltage for operating the control from a remote point by a switch, thermostat, time clock, or the like, the entire portable unit being enclosed in the casing. As applied to a portable air conditioning unit or other device to be controlled, my invention provides a method of remotely controlling the operation of the device without mechanically wiring the control to the device to be controlled, thereby saving labor and cost of installation of the controlled device. With the control unit of this invention, it is merely necessary to plug the air conditioner or other device into the portable control and then plug the portable control into the normal electrical power source, then plug the thermostat switch or other electrical control equipment into the portable control unit. By "remote control" is meant any distance away from the normal control provided on the air conditioner or other device to be controlled. The portable control unit of this invention entirely eliminates outside electrical wiring such as was heretofore required for control methods, and provides safe, and simple and effective control of the device.

The invention provides a means of remotely controlling the device from any point by a manually operated switch or electrically operated mechanism which may be made sensitive to any desired predetermined condition, such as the passage of time or change in temperature. It will be understood that the timer, thermostat, or other device for registering the critical condition may be pre-set to become operative for cut-off and cut-in times predetermined by the user.

The invention further provides a means of remotely controlling more than one unit (Fig. 3) from a portable master control unit arranged to turn on the devices to be controlled in timed sequence so as not to overload the electrical circuits by having all units start at the same time responsive to one control.

The invention above described may be used for portable operation or may be built internally of the air conditioner or other device to be controlled.

The invention makes it unnecessary to use separate timer or thermostat control units for each air conditioner or other device controlled. The device may be attached to an air conditioner or other equipment to be controlled without changing or entering into the internal electrical wiring of such equipment.

As shown in the drawings:

Fig. 3 is a wiring diagram illustrating the application of the invention to more than one electrical device to be controlled.

Figure 1:
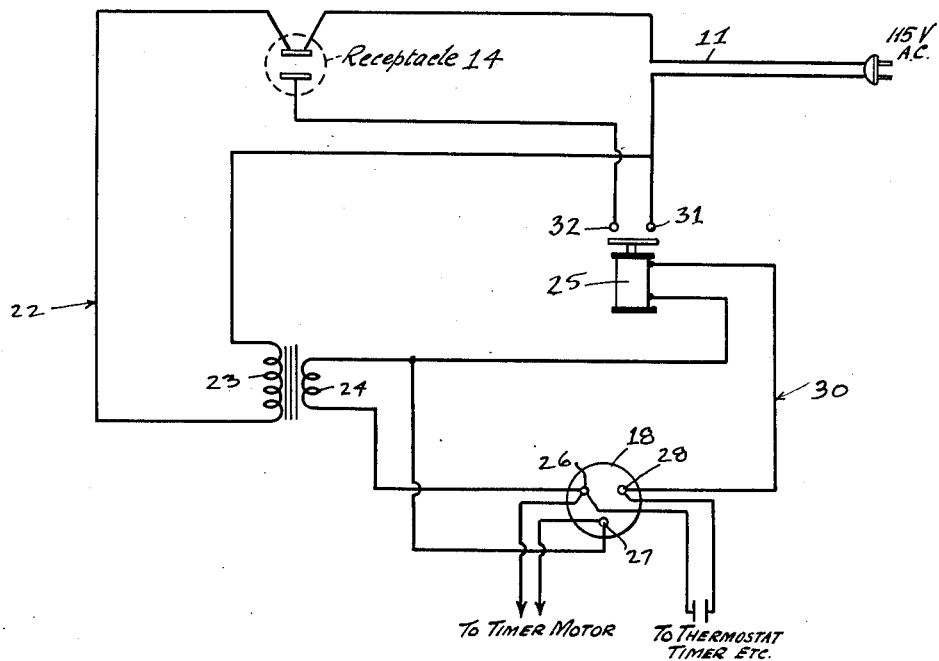
Fig. 1 is a wiring diagram of a circuit and associated mechanisms in a control unit for a single device to be controlled.
Figure 2:
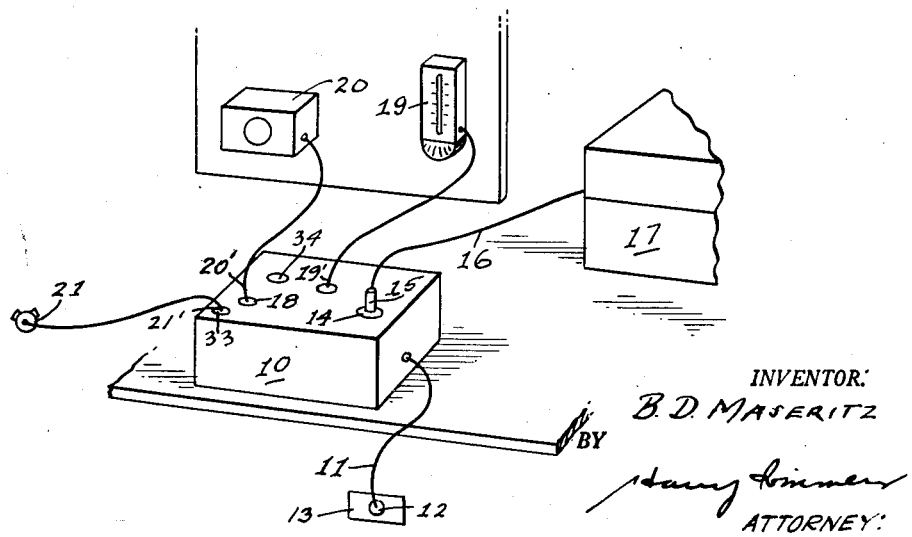
Fig. 2 is a schematic partly fragmentary perspective view of one form of control unit of this invention, showing, fragmentarily, a device to be controlled by the unit of this invention, connected thereto.
Figure 2:
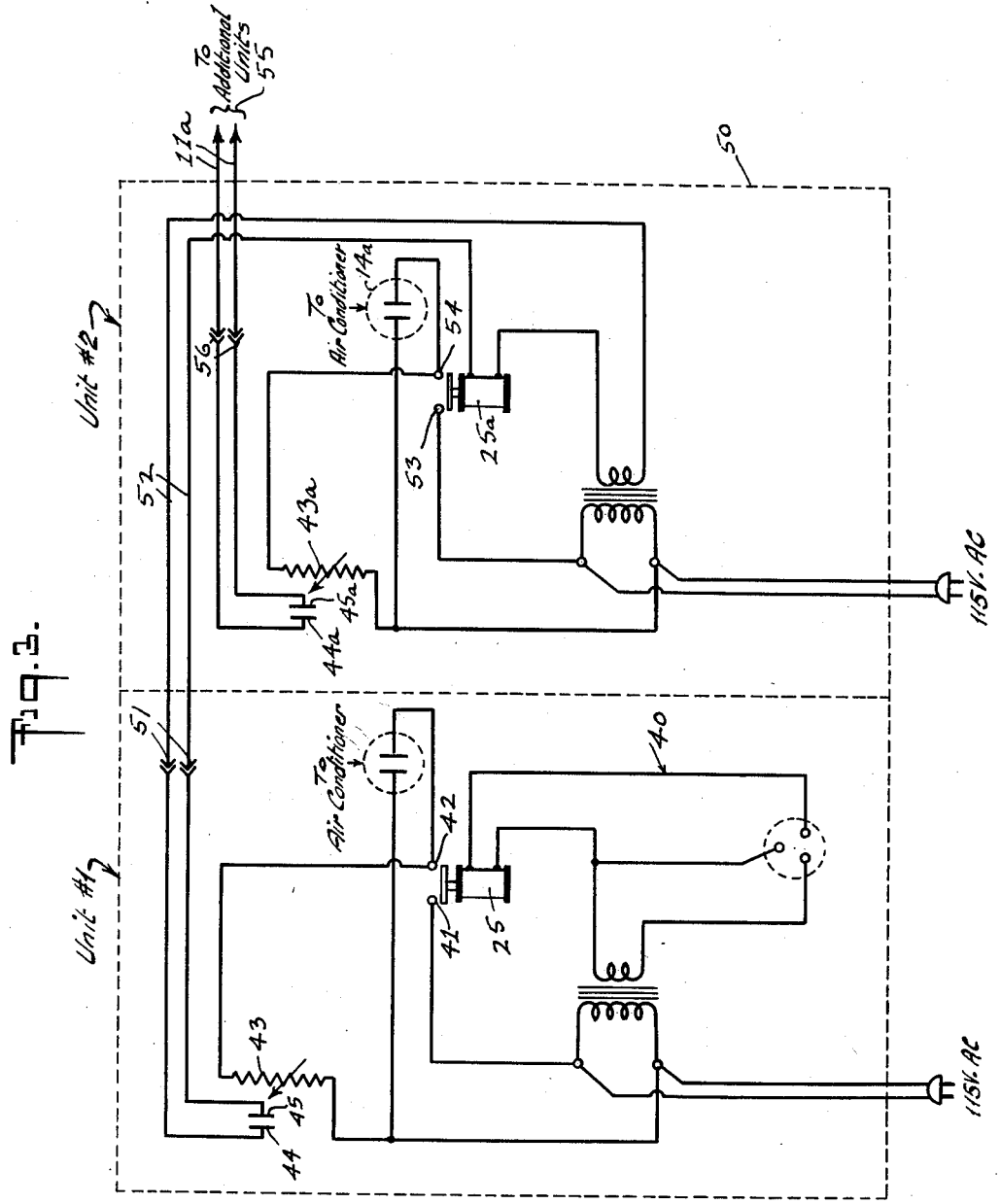

The device of this invention, as shown in Fig. 2, comprises a self-contained casing 10 of any suitable proportions and outline but preferably having an electric cord 11 internally connected to the control circuit in the casing, said cord unit extending from the casing and terminating in the usual plug 12 to be connected to the usual outlet 13. The casing 10 is further provided with a receptacle 14 (preferably at the top of the casing where it may conveniently be used) into which may be inserted the plug end 15 of the electric cord 16 of the air conditioner or other device 17 to be controlled. The circuit between the cords 11 and 16 internally of the casing 10 may have cut thereinto a receptacle 18 into which the thermostat 19, timer 20, remote control switch 21 or the like may be connected by means of their respective plug ends 19', 20', 21', respectively. Receptacle 18, as will be apparent to those skilled in this art, may be of any suitable type to receive one or more of such plugs, or separate plugs as indicated at 18, 33, 34, may be provided. If desired, one or more of the control devices, for example, 19, 20, may be combined with a single cord and plug. The control circuit 22 connects the electric cord 11 internally of the casing 10, as shown in Fig. 1, through the receptacle 14 with the primary 23 of a transformer which, with other parts mentioned, is located internally of the casing. The circuit between the secondary 24 of the transformer and a relay 25 is completed through contacts 26, 28 in a receptacle 18 by the electric timer, thermostat, etc., plugged into said receptacle, the secondary current for the timer or motor or other device being taken at contacts 26, 27, in the secondary circuit 30. When the circuit to relay 25 is completed, the latter is actuated to close contacts 31, 32 to complete the circuit between receptacle 14 to and the electric cord 11 to the air conditioner or other device.

Fig. 3 illustrates the circuit of a single self-contained casing 10 used to control two or more air conditioning or other devices in timed sequence responsive to single or master control devices, if desired. The secondary control unit circuit for the form of Fig. 3 is generally designated at 40. Closing of contacts 41, 42 of relay 25 in the Fig. 3 circuit, however, also energizes a thermal or other time-delay relay or element 43, causing the element to heat, and, after a period of time, closing the contacts 44 and 45, energizing the relay 25a of unit 50. Relay 25a of unit 50 might thus be utilized to control the second air conditioning or other device to the connectors 51, and connecting the wires 52, closing contacts 53, 54, for supplying power to the receptacle 14a to the air conditioner or other device plugged into said receptacle, repeating the operation of closing the circuit to the thermal time delay relay or elements 43a, closing the contacts 44a, 45a, to the next control unit (indicated at 55) through the cord 11a, and connectors 56, the arrangement being repeated for all additional units. There are thus provided time intervals for the actuation of each unit thus controlled in timed and spaced sequence to the actuation of the previous unit, while all of said units may thus be made responsive to a single thermostat or control device or switch or other mechanism.

Having thus described my invention, what I claim as new and desire to secure by Letters Patent is:

1. A self-contained electrical control unit for controlling the circuit between a plurality of electrically actuated devices, and a source of current supply therefor, said control unit comprising a casing, having a transformer therein, and a circuit in said casing connected between the transformer and a receptacle in the casing for the electrically actuated device plug, a relay and a time delay relay element in said circuit, the closing of the relay energizing the time relay element to cause the latter to be heated and thereby close to energize a second relay wired to a circuit for the second device to supply power to a receptacle on said control unit to which the second device may be connected, whereby the said circuit for the second device may repeat the operation of closing a circuit to a time delay element closing contacts to a third control circuit to repeat the control operation.

2. A self-contained electrical control unit for controlling the circuit between a plurality of electrically actuated devices, and a source of current supply therefor, said control unit comprising a casing, having a transformer therein, and a circuit in said casing connected between the transformer and a receptacle in the casing for the air conditioner device plug, a first relay and a time delay relay element in said circuit, the closing of the first relay energizing the time delay relay element to cause the latter to close after a time interval to energize a relay wire to a circuit for the second device to supply power to a receptacle on said control unit to which the second device may be connected, whereby the said circuit for the second device may repeat the operation of closing a circuit to a time delay element closing contacts to a third control circuit to repeat the control circuit operation.

3. A self-contained electrical control unit for controlling the circuit between a plurality of electrically actuated devices, and a source of current supplied therefor, said control unit comprising a casing having a transformer therein, and a circuit in said casing connected between the secondary of the transformer and a receptacle in the casing for the electrically actuated device plug, a first relay in said circuit and a time delay relay element energized on the closing of the first relay to cause the time delay relay element to be actuated to thereby close a circuit for the second electrically actuated device to supply power to a receptacle on said control unit to which the said second device may be connected.

References Cited in the file of this patent

UNITED STATES PATENTS

| Number | Name | Date |
|---|---|---|
| 2,480,827 | Armstrong | Sept. 6, 1949 |
| 2,484,092 | Hopgood | Oct. 11, 1949 |